April 28, 1931. C. H. ROBERTS 1,802,835
BULKHEAD
Filed Oct. 7, 1929
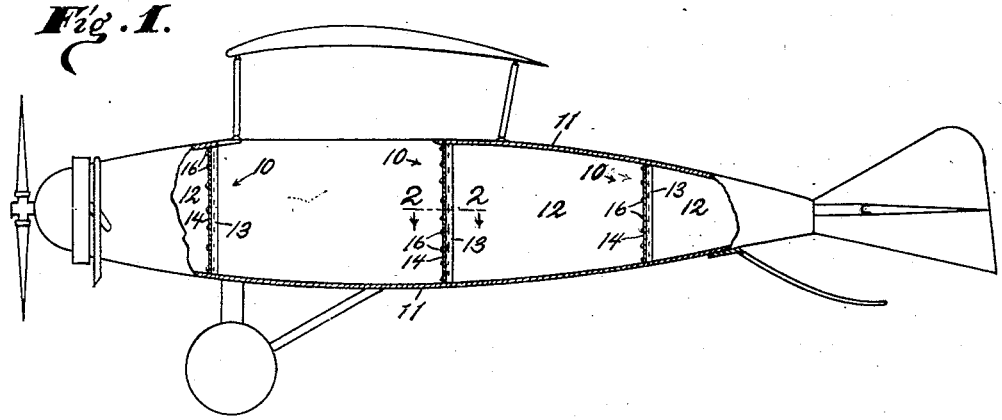
Fig. 1.
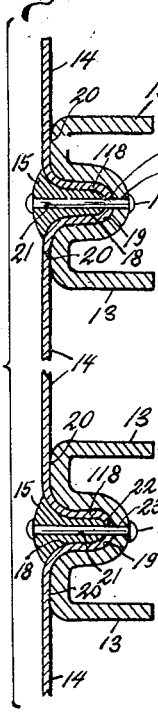
Fig. 2.
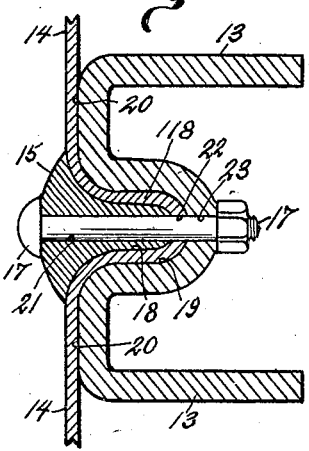
Fig. 3.
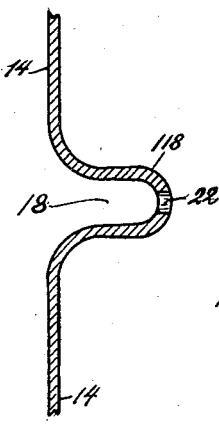
Fig. 4.
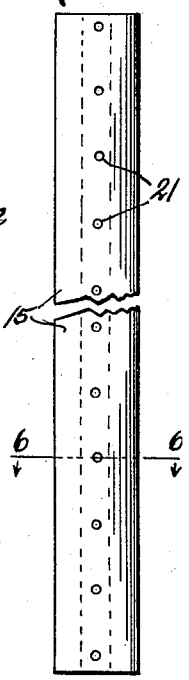
Fig. 5.
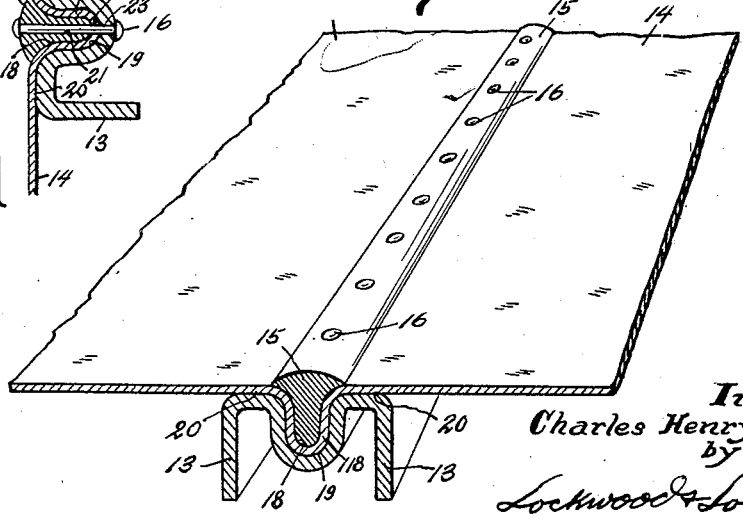
Fig. 7.
Fig. 6.
Inventor.
Charles Henry Roberts.
by
Lockwood & Lockwood
His Attorneys.

Patented Apr. 28, 1931

1,802,835

UNITED STATES PATENT OFFICE

CHARLES HENRY ROBERTS, OF PHOENIX, ARIZONA, ASSIGNOR TO ROBERTS AIRCRAFT CORPORATION, A CORPORATION OF ARIZONA

BULKHEAD

Application filed October 7, 1929. Serial No. 397,953.

This invention relates to means for securing a metal cover to a support so as to form an improved bulk-head for airplanes and the like, and the principal object thereof is to provide a simple means for securing the cover to the support so as to entirely eliminate direct strain on the rivets or bolts by which the parts are connected. To that end I roll grooves into the sheet metal cover from one side so as to form spaced protrusions on the other side that are adapted to be fitted into grooves formed in the faces of channel iron supports and the protrusions are held therein by means of wedge-shaped bars that are fitted into the grooves in the cover and secured in place by rivets or bolts that pass through the wedges, cover and supports, which arrangement of parts prevents direct strains on the rivets.

Another object of the invention is to more securely attach the cover to the channel irons and also greatly strengthen the bulk-head which is accomplished by use of the wedge bars to engage substantially all the surface on the inside of the protrusions of the cover and hold them firmly seated in the grooves in the channel irons, whereby the structure is greatly strengthened around the rivets connecting the cover to the supports.

As is well known the covers used in bulkheads heretofore have been secured in place by rivets with only the small flange of the rivet head engaging a similar small surface on the cover so that the strains and vibrations on the bulk-heads were imparted directly to the rivets to shear them off, tear the cover away or open spaces around the rivets to cause leaks.

In my bulk-head the cover is tightly engaged by the wedges so it is not easily affected by ordinary strains or twists on the bulkhead and the arrangement of the parts is such as to protect the rivets against excessive wear and positively prevent leakage through the bulk-head.

Another object of this invention is to provide a bulk-head having parts that can be easily and quickly secured together to form a very rigid gas-tight structure with the parts strongly connected by a relatively small number of rivets. In other words my bulk-head requires only about half the number of rivets that are used in connecting the parts of bulkheads constructed heretofore.

Features of invention are shown in the construction, combination and arrangement of parts whereby a bulk-head is provided that is substantially gas and water-tight.

Other objects, advantages and features of invention may appear from the accompanying drawings, the subjoined detailed description and the appended claim.

The accompanying drawing illustrates the invention, in which:

Figure 1 is a semi-diagrammatic sectional view of an airplane showing it provided with bulk-heads constructed in accordance with this invention and arranged in the body to separate its interior into gas and water-tight compartments. Fig. 2 is a fragmental enlarged section on line 2—2, Fig. 1, showing a portion of the bulk-head constructed in accordance with this invention. Fig. 3 is a fragmental sectional view analogous to the upper portion of Fig. 2 showing the parts secured together by a machine bolt instead of by a rivet. Fig. 4 is a fragmental sectional view of the metal cover detached, showing a groove extending into one side to form a protrusion on the other side of the cover. Fig. 5 is a fragmental plan view of the wedge detached. Fig. 6 is a cross section on line 6—6, Fig. 5, showing the detailed construction of the wedge bars. Fig. 7 is a fragmental, sectional perspective view of the bulk-head in an inclined position.

The bulk-head 10 can be secured in the body 11 of an airplane, aircraft, sea-planes and the like, to form water and gas-tight compartments 12, and the bulk-head includes the channel irons 13, cover plate 14, wedge bars 15 and rivets 16 or bolts 17.

In forming the bulk-head I roll grooves 18 that extend into the cover plate from one side so as to form depressed protrusions 118 on the other, and the protrusions are formed to fit snugly into depressed ribs and grooves 19 in the channel irons 13 with the cover plate in full contact with the faces 20 of the channel irons. The wedge bar 15 is relatively thick and formed so that its tapered sides are of substantially the same curvature as the grooves 18 in the cover plate so that the wedges when fitted into place are in full contact with the walls of the grooves, and the wedge is provided with spaced rivet holes 21 that register with the holes 22 in the cover and the holes 23 in the channel irons so that the parts can be secured together by the rivets 16 or bolts 17, and when properly secured together form a bulk-head that is impervious to leakage of water or gas.

In Fig. 3 I show the parts secured together by steel machine bolts 17 so that great pressure can be applied to the wedge bars 15 to fully seat them in the grooves and force the cover plate into close contact with the faces of the channel irons.

The cover plate is preferably sheet metal and said cover plate and the channel irons and the wedge bars are all rolled preferably, to form the protrusions or ribs and grooves, and the wedge bars are relatively very thick at the point where the bolts pass through them, as appears in Figs. 2 and 3. Consequently a very strong and a very light construction is provided for in all metal planes.

By "bulk-head" in the claim is meant a partition wall separating compartments, and by "bolts" is meant bolts whether provided with rivet heads or nuts.

I claim as my invention:

A bulk-head for airplanes including a plurality of parallel supporting channel irons each formed with a longitudinal and centrally depressed portion extending inwardly between the side flanges of said channel irons, a cover plate on said supporting channel irons with corresponding depressions formed therein for fitting in the depressed portions of said irons, wedge bars fitting in the depressed portion of said cover plate and extending the full length of said irons and across said plate, and bolts extending through said channel irons, cover plate and wedge bars for securing them together.

In testimony whereof, I have hereunto affixed my signature.

CHARLES HENRY ROBERTS.